United States Patent [19]

Beune et al.

[11] 4,432,395

[45] Feb. 21, 1984

[54] PIPE PART WITH SOCKET PROVIDED WITH LONGITUDINALLY EXTENDING CHANNELS

[75] Inventors: Joannes H. Beune, Hardenberg; Roelof H. Marissen, Bergentheim, both of Netherlands

[73] Assignee: Wavin B.V., Netherlands

[21] Appl. No.: 370,536

[22] Filed: Apr. 21, 1982

Related U.S. Application Data

[62] Division of Ser. No. 108,049, Dec. 28, 1979, Pat. No. 4,344,461.

[51] Int. Cl.$^3$ ............................................. F16J 15/10
[52] U.S. Cl. .................................. 138/109; 138/115; 138/148; 138/155; 277/207 A; 285/138; 285/344; 285/345
[58] Field of Search ............... 138/109, 111, 113, 114, 138/115, 148, 149, 172, 179; 285/138, 379; 277/207 A

[56] References Cited

U.S. PATENT DOCUMENTS

| | | |
|---|---|---|
| 724,210 | 3/1903 | Scherer . |
| 2,572,062 | 10/1951 | Sexton . |
| 2,894,537 | 7/1959 | Carr . |
| 3,193,919 | 7/1965 | Rouse ............................... 138/115 X |
| 3,464,450 | 9/1969 | Steffenini ......................... 138/172 X |
| 3,747,646 | 7/1973 | Farfaletti-Casali . |
| 3,857,589 | 12/1974 | Oostenbrink . |
| 4,202,568 | 5/1980 | Strom ....................... 285/DIG. 4 X |
| 4,341,392 | 7/1982 | Dongeren ....................... 138/109 X |

FOREIGN PATENT DOCUMENTS

| | | |
|---|---|---|
| 742951 | 9/1966 | Canada . |
| 1158007 | 1/1958 | France . |
| 2326647 | 4/1977 | France . |
| 1093662 | 12/1967 | United Kingdom . |
| 1220140 | 1/1971 | United Kingdom . |

Primary Examiner—James E. Bryant, III
Attorney, Agent, or Firm—Wigman & Cohen

[57] ABSTRACT

The invention relates to a pipe part with a socket being provided with longitudinally extending channels. The channels extend into the wall of the socket. The socket engages a J-shaped retaining ring which forms with the socket a recess for retaining the flange of a seal that includes a sealing sleeve. The retaining ring adheres to the outer side of the socket by an adhesive.

11 Claims, 13 Drawing Figures

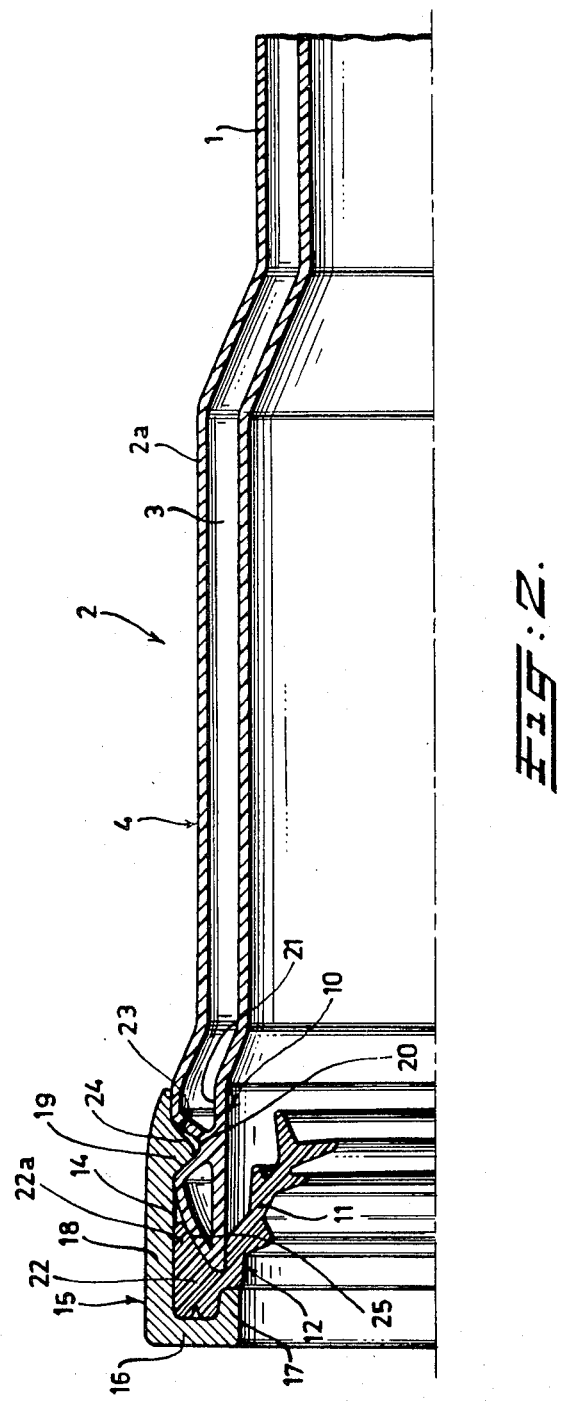

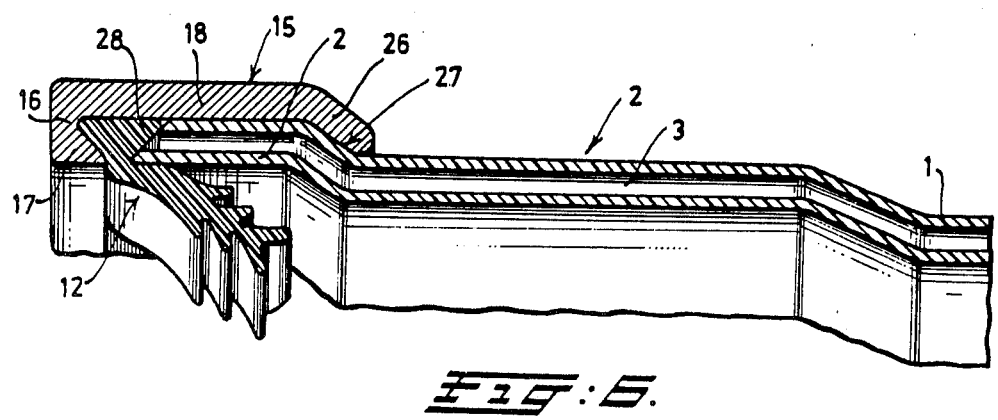
_Fig. 6._
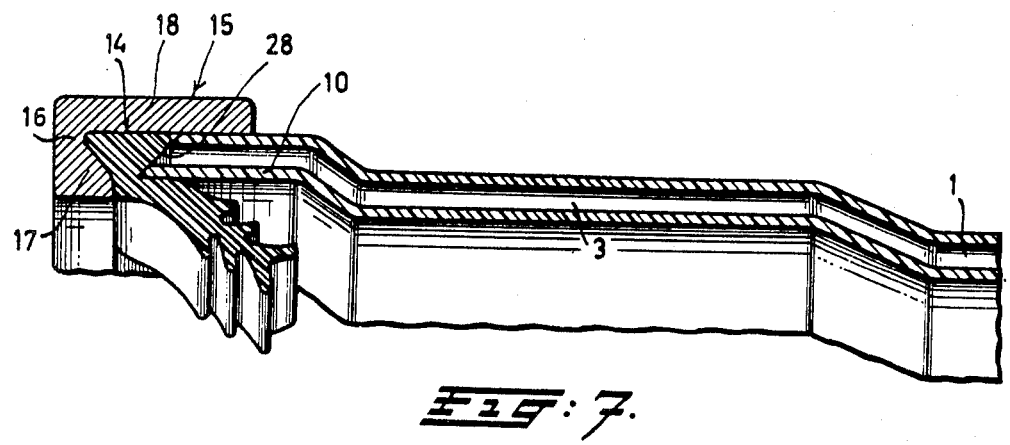
_Fig. 7._
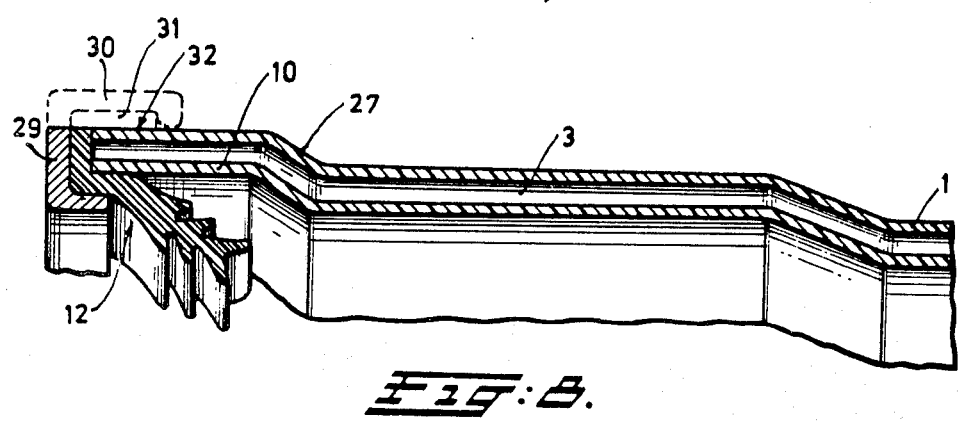
_Fig. 8._

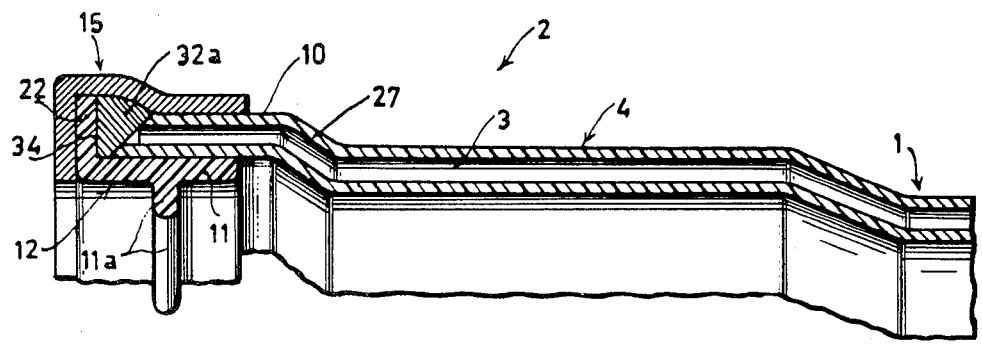
Fig: 9a.
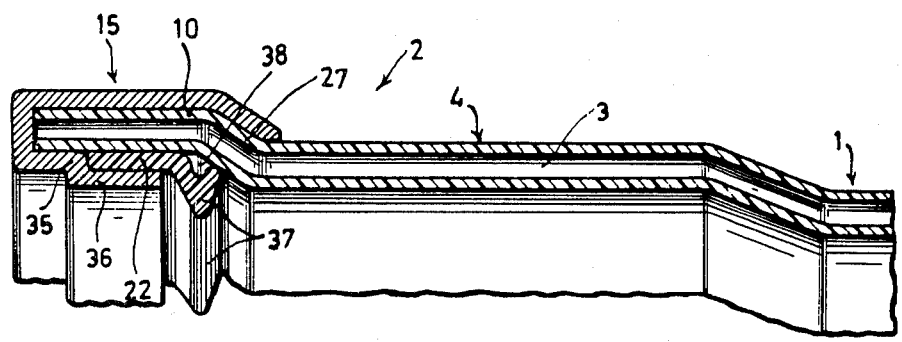
Fig: 10.
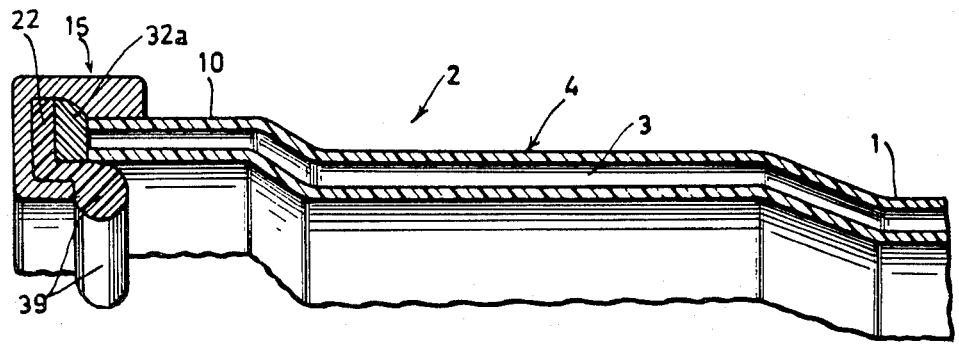
Fig: 11.

PIPE PART WITH SOCKET PROVIDED WITH LONGITUDINALLY EXTENDING CHANNELS

This is a division of application Ser. No. 108,049, filed Dec. 28, 1979, now U.S. Pat. No. 4,344,461.

BACKGROUND OF THE INVENTION

1. Field of the Invention

The present invention concerns a pipe part with a socket, the wall being provided with longitudinally extending channels.

2. Description of the Prior Art

Such a pipe part with a socket is known per se. In said known pipe part with a socket the longitudinal channels in the wall of said pipe part only extend up to the transition between said pipe part and said socket. A result thereof is that on using pipe parts the wall of which comprises longitudinally extending channels, the walls of said channels have to be pressed onto each other over the entire length of the socket, so that a socket wall part without longitudinally extending channels is produced. The result of this pressing operation is that considerable problems will occur in practice. Though walls may be pressed onto each other over the length of the socket, the properties of strength of the material of the socket so obtained are often insufficient.

Moreover, welding or heatsealing a socket to a pipe part, the wall of which comprises longitudinally extending channels, will also cause problems, since the ends of the longitudinally extending channels of the pipe part have to be sealed off by disposing an end sealing wall, said wall simultaneously serving as a connection with the socket to be formed.

SUMMARY OF THE INVENTION

The present invention aims to provide a pipe part with a socket, the wall of which is provided with longitudinally extending channels, wherein the channels, being continuous or not, extend in the wall of the socket over at least part of the length of the socket.

Such a pipe part with a socket offers the advantage that the properties of strength of said socket are substantially equal to the properties of strength of the pipe part, which facilitates processing of the pipe parts and the formation of sockets with said pipe parts.

The socket according to the invention advantageously comprises an annular groove for the receipt of a sealing member, thus causing the socket to be used immediately for the coupling with another pipe part, the wall of which comprises longitudinally extending channels.

The inner diameter of the groove being located at a distance from the socket end, may be substantially equal to the outer diameter of said socket, thus causing a closing of the longitudinally extending channels at the location of said groove, while the properties of strength of said socket are then only slightly changed.

In a very appropriate embodiment of the present invention, the pipe part with the socket is provided with an annular end groove formed by engagement of the retaining ring and socket. The latter embodiment is very convenient in that no separate annular groove need be disposed inside the socket which is a rather difficult technical process. Said groove can now be formed in the socket starting from the interior of the pipe part.

A sealing member part disposed between the inner side of the retaining ring and the front side of the socket may now provide a resilient fixing of an axially movable retaining ring. When the bottom of the assembly is subjected to a vigorous impact an axial movement of said retaining ring can thus be realized, whereafter the retaining ring will return to its original position. As described hereinbefore, the latter movements are due to the resilient action of the flexible material of the sealing member part, being disposed in between the front side of the socket and the inside of the retaining ring.

Said retaining ring may be coupled with the socket by means of a snap-connection which is provided with an annular projection at the inside of the substantially J-shaped retaining ring and an annular recess at the outside of the socket obtained by a pressing of the walls of the channels together at the location of said connection. In this manner a sealing off of the channels is obtained by pressing them together and also an additional seal at the front end of the socket, to wit, the front side of the channels, by disposing the sealing member part at said front side of the socket; the latter provision ensures an absolute closure of said channels.

Even if the channels at the other end of the pipe part would be open, sewage water from the pipes will never be able to reach the front ends of the channels in the socket end, so that a flowing out of undesired liquids from channels into a pipe line, consisting of a pipe part with a socket and a projecting pipe part, it absolutely impossible.

So as to facilitate an axial displacement of the retaining ring, the annular recess at the outside of the socket and the annular projection upon the retaining ring have a cross-sectional V-shape or a rectangular, trapezoidal, or a wave-shape, and a clearance existing at least between the two wall parts of the recess facing each other and the projection, thus allowing a yielding of plastic material. The advantages of an embodiment of this type are manifold, since the retaining ring or the socket cannot be damaged in case the pipe part with socket and the retaining ring mounted thereupon will hit the bottom vigorously, since, due to the axial movement of the retaining ring being absorbed by the flexible material of the sealing member part disposed in the annular groove, which is situated in between the front side of the socket and the inside of the retaining ring, damage owing to a vigorous impact is absolutely excluded.

The retaining ring may also be fixed by an adhesive.

According to a very advantageous embodiment, a pipe part with a socket, the wall of which comprises longitudinally extending channels, comprises channels which will extend continuously or discontinuously in the wall of the socket over the length of said socket, the front ends of the channels being sealed off, said seal consisting of a flexible sealing end part, cooperating sealingly with the front side of the socket while sealing the longitudinally extending channels, or of a wall being integral with the socket and forming an end seal. The wall forming an end seal may appropriately extend undulatingly between the free end of the socket and the annular recess at the outside of said socket when a retaining ring is used cooperatively with a recess in the wall of the socket, by means of a snap-connection.

BRIEF DESCRIPTION OF THE DRAWINGS

FIG. 2 shows a longitudinal section of a pipe part with socket and an annular end groove chamber with a retaining ring and sealing member;

FIG. 6 shows another embodiment of a pipe part with socket and an annular end groove chamber;

FIG. 7 shows a pipe part with a socket comprising an annular end groove chamber with an adhering retaining ring;

FIG. 8 shows another pipe part with socket comprising an annular end groove chamber and a sealing or pressing ring;

FIG. 9a shows a further embodiment of a pipe part in accordance with the invention;

FIG. 10 shows a further embodiment of a pipe part in accordance with the invention; and FIG. 11 also shows another embodiment of a pipe part in accordance with the invention.

DESCRIPTION OF PREFERRED EMBODIMENTS

Figure 1:
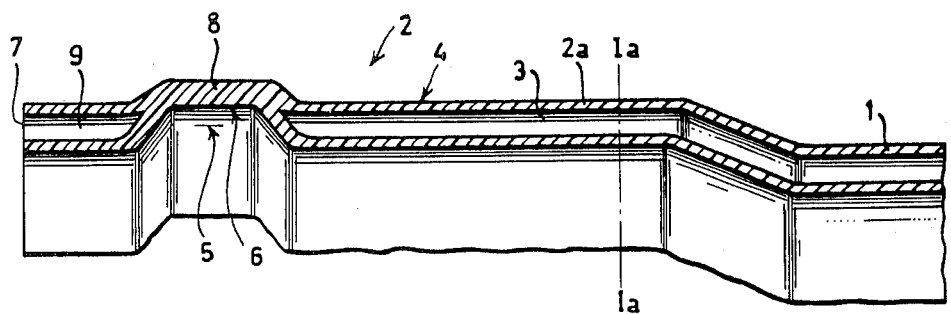
FIG. 1 shows a pipe part with socket in accordance with the invention, comprising an annular groove.
Figure 1A:
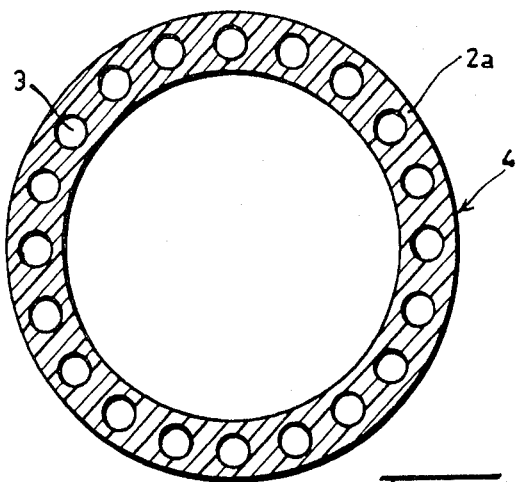
FIG 1a is a view of the front side of a pipe part with socket according to FIG. 1.

FIG. 1 shows a pipe part 1 with a socket 2. The wall 4 of the pipe part and socket is provided with longitudinally extending channels 3. Said longitudinally extending channels 3 have a rounded cross-section and preferably an elliptical or circular shape. Said extending channels 3 continue in the socket 2 and end in the free ends 7.

An annular groove chamber 5 is disposed at a distance from the free end 7 of the socket 2 in order to receive a sealing member 12 between said socket 2 of a pipe part 1 and the projecting pipe part (not shown). Said groove chamber 5 is obtained by pressing down the walls of the channels 3. This pressing may be so performed that the inner diameter 6 of an annular groove chamber 5 substantially corresponds to the outer diameter of the outer wall 2a of the socket. Consequently, only a slight elevation 8 is obtained upon the outside of socket 2.

In the abovedescribed manner, the advantage is obtained that no connection will exist between the inner side and the outer side of the pipe, even when leakages occur from the inside of said pipe into the channels. FIG. 2 shows a very convenient embodiment of the present invention, to wit, a pipe part 1 with longitudinally extending channels 3 with an adjoining socket 2. Said socket 2 is provided with a widened end 10 for the receipt of a sealing sleeve 11 of a sealing member 12 provided with a front part 22 being present within an annular end groove chamber 14 of said pipe part. Said annular end groove chamber 14 is formed by means of a retaining ring 15 connected with socket 2 and being fixed on the outside of said socket 2. Said retaining ring 15 has at least a longitudinal J-shape, thus providing said retaining ring 15 on the one hand with a bottom 16, a short leg part 17 and a long leg part 18. Said long leg part 18 is provided with an annular inwardly directed thickened end 19, co-operating snappingly with an annular recess 20 upon the outside of the socket 2. At the location of said annular recess 20, the outer wall 2a of the socket 2 rests against the inside walls 21 of the channels 3, so that a very good seal is obtained between the front side of the socket 2 and the inside walls 21 of the channels 3.

The front sealing member part 22, being integral with the sealing sleeve 11 of the sealing member 12, is disposed within the annular end groove chamber 14.

The cross-section of the annular recess 20 and the inwardly directed thickened end 19 of the long leg part 18 of the retaining ring 15 is wave-shaped, rectangular, or trapezoidal. In order to facilitate an axial displacement of the retaining ring with respect to the socket, said embodiment has such a shape that a wall part 23 of the annular recess 20 and a wall part 24 of the inwardly directed thickened end 19 are kept at a distance from one another with clearance, so that the plastic material is able to yield if the sealing ring 15 is subjected to an axial impact which may occur when the pipe part 1 with socket, the retaining ring 15 fixed upon the socket, and the sealing member 12, hit the bottom vigorously, especially when similar pipe parts are unloaded from vans.

Figure 3:
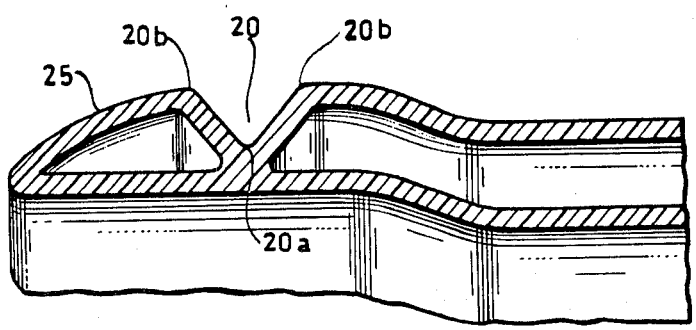
FIG. 3 shows a detail of a pipe part with socket as shown in FIG. 2.

An appropriate retaining of the front sealing member part 22 is obtained by providing said front sealing member part 22 with an inwardly directed part 22a extending in the space formed between the inner side of long leg part 18 of the retaining ring 15 and a chamfer 25 obtained by the end sealing wall of the channels 3. An easy and rapid mounting of the retaining ring 15 is obtained by giving said end sealing wall part, forming the chamfer 25, a rounded shape. This mounting arrangement holds also for the transition 20b of the recess 20 (FIG. 3). The bottom 20a of said recess 20 will have an optimum strength by giving it a rounded shape too.

Figure 4:
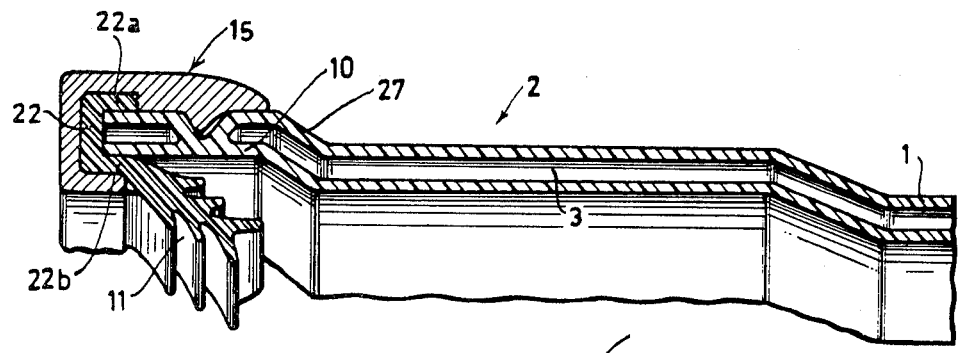
FIG. 4 shows a variant of a pipe part with socket and an annular end groove chamber according to FIG. 2.

FIG. 4 shows a further embodiment of the sealing member 12, in this case being provided with a sealing member part 22, which extends on the one hand with part 22a across the outside of the socket 2 and on the other hand with part 22b across the inside of said socket 2. The latter embodiment also comprises a connection between the sealing member part 22 and the sealing sleeve 11. The retaining ring 15 used in this embodiment, generally consisting of a material being more impact-resistant than the material of the socket 2, may consist of a cast polyurethane or, for example, a polypropylene or a polyethylene. The sealing ring 15 consists advantageously of a polyethylene or a polypropylene material.

Figure 5:
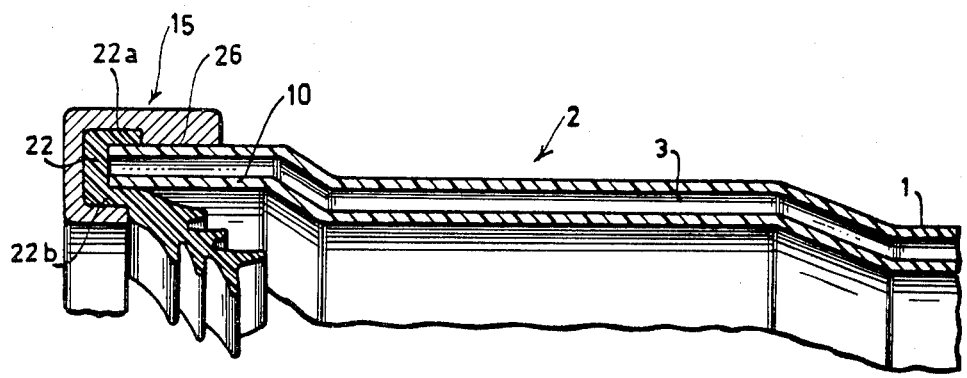
FIG. 5 shows a modified embodiment of a pipe part with socket comprising an annular end groove chamber.

FIG. 5 also shows an embodiment according to the present invention, the retaining ring 15 in this embodiment now being fixed to the outside of the socket 2, by means of an adhesive connection 32. In this embodiment the sealing member part 22 is also provided with parts 22a and 22b extending across the outside and the inside of the socket 2 in the vicinity of its front end.

In FIG. 6 an embodiment is shown in which the retaining ring 15 is retained by means of an inwardly directed retaining ring end edge 26 which clampingly engages the transition 27 between the widening end 10 and the socket 2.

In this embodiment the retaining ring 15 also comprises a long leg part 18, a bottom part 16 and a short leg part 17. The inner diameter of the retaining ring 15 equals the inner diameter of the widened end 10 of the socket 2, but this is not essential since the inner diameter mostly equals the inner diameter of the socket 2 itself, in order to facilitate the centering operation. The inner diameter of the leg 17 now equals the inner diameter of the socket 2.

In FIG. 7 the retaining ring 15 is fixed to the outside of the socket 2, said retaining ring 15 being provided with a bottom part 16, a short leg part 17 and a long leg part 18.

So as to effect a proper retaining of the sealing member 12, the front end 28 of the socket 2 is chamfered in the embodiments shown in both FIGS. 6 and 7, the sealing member part 22 being disposed within an annular end groove chamber 14 in the retaining ring 15, being adapted to conform to the shape of said chamfer 28.

FIG. 8 shows a further embodiment wherein the sealing member 12 is retained by means of a ring 29.

Said ring 29 is pressed into the sealing member 12, which was previously disposed upon the widened end 10, which pressing operation results in a tight fixing of said sealing member 12. If desired, a part 31 of the sealing member 12 may be fixed by means of an adhesive 32. Said ring 29 may be engaged across part 31 by means of an annular part 30.

Figure 9:
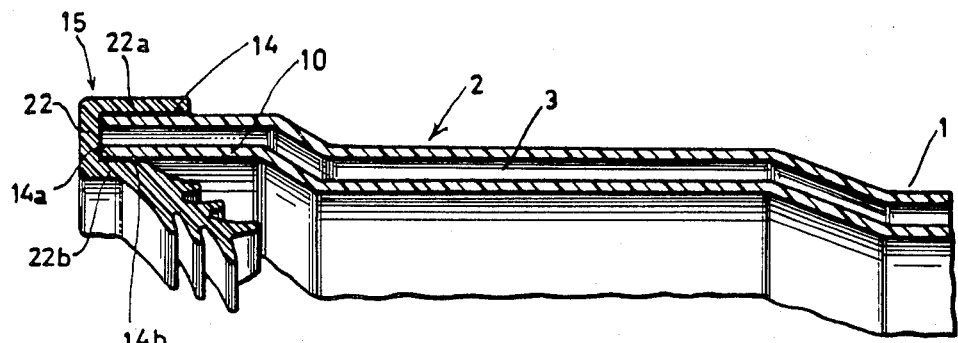
FIG. 9 shows a pipe part with a socket comprising a resilient end sealing member sealing off the front ends of the channels.

FIG. 9 shows a further embodiment wherein the sealing member 12 comprises a main front part 22 which seals off the front side of the socket 2 and thus the channels 3 in said socket,. Said sealing member 12 also comprises a part 22a, extending across the outside of the socket 2 over a certain distance thereof and a part 22b, extending across the inside of said socket 2.

Said sealing member 12 is fixed to the front side of the socket 2 by an adhesive 32, e.g. a plastic glue, and thus seals off the channels 3. It is obvious that the latter embodiment does not require a particular retaining ring 15, as the adherence by means of the glue layer 32, 32a and 32b ensures an optimum fixing of the sealing member 12 to the socket 2.

The aforedescribed pipe part 1 with a socket 2 consists of a thermoplastic material, like for instance polyvinylchloride, the retaining ring 15 advantageously consisting of a material having a higher yield and an impact resistance, exceeding those of polyvinylchloride, so in particular a polyolefin material, such as a polyethylene or a polypropylene.

The material of the sealing member 12 advantageously consists of an elastomer.

Instead of a polyethylene retaining ring 15, a retaining ring consisting of polyurethane may also be used, the latter being cast. The latter excludes an axial movement between the retaining ring 15 and the socket 2.

FIG. 9a shows an embodiment in which the retaining ring 15 is retained by shrinkage over a collar-shaped part 32a, obtained by pressing the walls at the end of a pipe, while forming an endwall 34. The sealing member 12 comprises a projection 11a.

FIG. 10 shows an embodiment in which the retaining ring 15 is retained by transition 27 between the widened end 10 and socket 2. Said retaining ring 15 comprises, however, an inwardly staggered ring part 35, and a rather long leg 36, which extends in the vicinity of the aforementioned transition 27. The sealing member 12 comprises a head 42 and a sealing part 37 being formed so that an annular chamber 28 is produced which may easily absorb any tolerances of pipe parts.

FIG. 11 shows an embodiment in which the sealing member 12 comprises a front part 22 being retained by retaining ring 15 which cooperates with collar-shaped part 32a. The seal is effected by ring part 39.

What is claimed is:

1. A plastic pipe part with a socket, a wall of said pipe part being provided with longitudinally extending channels, said channels extending into the wall of the socket at least over a part of the length of the socket, a retaining ring, said retaining ring together with said socket forming an annular end groove chamber, said retaining ring being fixed to the outer side of the socket by an adhesive; and a sealing sleeve, said sealing sleeve being connected with a sealing member part received in said annular end groove chamber.

2. The plastic pipe part according to claim 1, in which the cross-section of the retaining ring is substantially J-shaped.

3. The plastic pipe part according to claim 1, in which the socket is provided with an end widening means for receiving the sealing sleeve.

4. The plastic pipe part according to claim 1, in which the front ends of the longitudinally extending channels are sealed off.

5. The plastic pipe part according to claim 1, in which the front end of the socket is sealed off by a wall providing an end chamfer.

6. The plastic pipe part according to claim 1, in which the inner diameter of the retaining ring is about equal to or slightly greater than the inner diameter of the socket.

7. The plastic pipe part according to claim 1, in which the front ends of the longitudinally extending channels are sealed off by a flexible end of a sealing part which sealing part is integral with a sealing sleeve.

8. The plastic pipe part according to claim 1, in which an end sealing part extends across the outside of the socket and across the inside of the socket.

9. The plastic pipe part according to claim 1, in which an end sealing part extends across the inside of the socket.

10. The plastic pipe part according to claim 1, in which the end of the socket is chamfered.

11. The plastic pipe part according to claim 1, in which the retaining ring engaging the socket consists of a material having a yield capacity and impact resistance exceeding that of the plastic material of the pipe part, said material being one of a polyolefin, a polyethylene and a polypropylene.

* * * * *